(12) United States Patent
Werner et al.

(10) Patent No.: US 6,358,908 B1
(45) Date of Patent: Mar. 19, 2002

(54) AZEOTROPIC COMPOSITIONS OF 1,3-DIOXOLANE AND HYDROCARBONS HAVING 5 OR 6 CARBON ATOMS AND THE USE THEREOF IN THE PRODUCTION OF FOAMS

(75) Inventors: Joachim Werner, Bethel Park, PA (US); Scott A. Kane, Wellsburg, WV (US); Herman P. Doerge, Pittsburgh; Eric F. Boonstra, Oakdale, both of PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 08/410,177

(22) Filed: Mar. 24, 1995

(51) Int. Cl.[7] .............................. C11D 7/26; C11D 7/60; C23G 5/024; C23G 5/032
(52) U.S. Cl. ...................... 510/411; 510/408; 264/53; 521/98; 521/131
(58) Field of Search .................... 252/170, DIG. 9; 264/53, DIG. 5; 521/98, 131; 510/408, 411

(56) References Cited

U.S. PATENT DOCUMENTS

| | | | |
|---|---|---|---|
| 4,055,507 A | 10/1977 | Dastur et al. | 252/162 |
| 4,076,644 A | 2/1978 | Burt et al. | 252/182 |
| 4,326,043 A * | 4/1982 | Narayan et al. | 521/137 |
| 4,359,541 A * | 11/1982 | Patton, Jr. et al. | 521/137 |
| 4,359,550 A * | 11/1982 | Narayan et al. | 524/871 |
| 4,898,893 A | 2/1990 | Ashida | 521/131 |
| 4,900,365 A | 2/1990 | Lund et al. | 134/12 |
| 4,960,804 A | 10/1990 | Doerge | 521/130 |
| 5,035,833 A | 7/1991 | Ogawa et al. | 252/182.24 |
| 5,096,933 A | 3/1992 | Volkert | 521/131 |
| 5,106,527 A | 4/1992 | Doerge et al. | 252/172 |
| 5,166,182 A | 11/1992 | Blanpied | 521/50 |
| 5,227,088 A | 7/1993 | Swan et al. | 252/172 |
| 5,283,003 A | 2/1994 | Chen | 252/350 |
| 5,294,358 A * | 3/1994 | Dantinne et al. | 252/67 |
| 5,302,212 A | 4/1994 | Desbiendras et al. | 134/40 |
| 5,338,411 A * | 8/1994 | Berg | 203/60 |

FOREIGN PATENT DOCUMENTS

| | | |
|---|---|---|
| JP | 1141995 | 6/1989 |
| JP | 1141996 | 6/1989 |

OTHER PUBLICATIONS

Comelli et al, *J. Chem. Eng. Data,* vol. 35, pp. 283–289, 1990 No Month Available.*
Inglese et al, *J. Chem. Thermodynamics,* vol. 12 pp. 1047–1050, 1980 No Month Available.*
Chemical Abstract 83:172236m, Abstract of Roeder, E., *Pharmazie,* vol. 30 No. 6, pp. 349–52, 1975 No Month Available.*
Chemiical Abstract 108:44739a, Abstract of Inglese et al, *Thermochim. Acta* vol. 122, No. 1, pp. 9–22, 1987, No Month Available.*
Röder,E. *Pharmazie,* vol. 30, No. 6 pp. 349–52, 1975 No Month Available.*
Inglese et al, *Thermochimica Acta,* vol. 122, No. 1, pp. 9–22, 1987 No Month Available.*
Lamberts, 1,1,1,4,4,4 Hexafluorobutane, a New Non–Ozone–Depleting Blowing Agent for Rigid PUR Foams, Polyurethanes World Congress 1991–Sep. 24, 26, pp. 734–739.

* cited by examiner

*Primary Examiner*—John Hardee
*Assistant Examiner*—Brian P. Mruk
(74) *Attorney, Agent, or Firm*—Joseph C. Gil; Lyndanne M. Whalen

(57) ABSTRACT

Azeotropic compositions made up of (a) from about 4 to about 50% by weight 1,3-dioxolane and (b) one compound selected from (1) about 75 to about 96% by weight cyclopentane, (2) about 60 to about 79% by weight 2-methyl pentane, (3) about 59 to about 77% by weight 3-methyl pentane, and (4) about 50 to about 69% by weight n-hexane in which the sum of the weight percent of (a) plus weight percent of (b) is approximately 100 percent are used as blowing agents in the production of polyurethane/polyurea foams.

4 Claims, 4 Drawing Sheets

AZEOTROPIC COMPOSITIONS OF 1,3-DIOXOLANE AND HYDROCARBONS HAVING 5 OR 6 CARBON ATOMS AND THE USE THEREOF IN THE PRODUCTION OF FOAMS

BACKGROUND OF THE INVENTION

The present invention relates to novel azeotropic compositions, a process for the production of foams in which these azeotropic compositions are used and to foams produced using these azeotropic compositions.

The use of trichloromonofluoromethane (CFC-11) and other chlorofluorocarbons as blowing agents in the production of urethane foams is well known. These CFC blowing agents are also known to have an adverse effect upon the ozone layer in the atmosphere. The urethane foam industry is therefore investigating methods for producing foams with good physical properties without using CFC blowing agents.

Initially, the most promising alternatives appeared to be hydrogen-containing chlorofluorocarbons (HCFCs). U.S. Pat. No. 4,076,644, for example, discloses the use of 1,1-dichloro-2,2,2-trifluoroethane (HCFC-123) and 1,1-dichloro-1-fluoroethane (HCFC-141b) as blowing agents for the production of polyurethane foams. However, HCFCs also have some ozone-depletion potential. There is therefore mounting pressure to find substitutes for the HCFCs as well as the CFCs.

Alternative blowing agents which are currently considered promising because they contain no ozone-depleting chlorine are fluorocarbons (FCs) and partially fluorinated hydrocarbons (HFCs). For example, the use of 1,1,1,4,4,4-hexafluorobutane as a blowing agent is disclosed in Lamberts, "1,1,1,4,4,4-hexafluorobutane, a New Non-Ozone-Depleting Blowing Agent for Rigid PUR Foams", *Polyurethanes World Congress* 1991 (September 24–26), pages 734–739.

U.S. Pat. No. 4,898,893 teaches that a blend of a liquid hydrocarbon and halogenated hydrocarbon is useful as a blowing agent for the production of isocyanurate foams.

The use of mixtures of a chlorofluorocarbon having a boiling point between 74 and 120° F. and an alkyl alkanoate having a molecular weight of no more than 88 as a blowing agent for foams is disclosed in U.S. Pat. No. 4,960,804. HCFC-123 and HCFC-141b are among the chlorofluorocarbons disclosed therein.

U.S. Pat. No. 5,035,833 discloses the use of a mixture of dichlorotri-fluoroethane and at least one paraffin having 5 or 6 carbon atoms as blowing agents useful for the production of rigid polyurethane foams.

U.S. Pat. No. 5,096,933 discloses a process for the production of rigid polyurethane foams in which cyclopentane, cyclohexane or a combination of cyclopentane and cyclohexane optionally with a low boiling (i.e., boiling point less than 35° C.) compound having no more than 4 carbon atoms which is homogeneously miscible in cyclopentane and/or cyclohexane is used.

Azeotropes of HCFCs and various compounds and azeotropes of organic compounds which may be used in combination with HCFCs have also been described in the prior art as being useful blowing agents for the production of foams.

U.S. Pat. No. 4,900,365, for example, teaches that azeotropes of a dichlorotrifluoroethane and isopentane are useful in the production of polyurethane foams.

U.S. Pat. No. 5,106,527 discloses the use of azeotropes of 2-methyl butane and 1,1-dichloro-1-fluoroethane as blowing agents for the production of rigid, closed cell foams.

The azeotropic mixtures taught in U.S. Pat. No. 5,166,182 must have boiling points below 50° C. These azeotropic mixtures are formed from organic compounds having surface active properties that enable the blended azeotropic mixture to become miscible with polymer resins. Examples of the organic compounds described as being useful in the production of such azeotropes include: n-pentane, acetone, methyl alcohol, methyl formate, ethyl formate, ethyl alcohol, 2-methyl butane, nitromethane, cyclopentane, 2,3-dimethyl butane, 2,2-dimethyl butane and dimethyl sulfide. These azeotropes may be used in combination with fluorocarbons but no azeotrope in which 1,3-dioxolane is present is taught or suggested.

U.S. Pat. No. 5,227,088 discloses azeotrope-like compositions which are made up of 1-chloro-3,3,3-trifluoropropane and a hydrocarbon containing five or six carbon atoms.

U.S. Pat. No. 5,283,003 discloses a blowing agent which is made up of at least one five-carbon member hydrocarbon, a chlorinated alkane and methyl formate. Methylene chloride is the preferred chlorinated alkane.

Azeotropic mixtures in which HCFCs are included are also known to be useful as cleaning solvents. U.S. Pat. No. 4,055,507, for example, discloses an azeotropic mixture of 1,2-dichloro-1,1-difluoroethane and 3-methylpentane which is taught to be useful as such a solvent. U.S. Pat. No. 5,302,212 teaches that an azeotrope of (perfluoroalkyl)ethylene and methanol may be used to clean a solid surface. Japanese 1,141,995 discloses an azeotropic mixture of 67 to 87% by weight of HCFC-123 and 13 to 33% by weight of 2-methyl butane which is useful as a cleaning solvent. Japanese 1,141,996 discloses an azeotropic mixture of HCFC-141b and n-pentane or 2-methyl butane or 2,2-dimethyl butane which is also taught to be useful as a cleaning solvent.

The use of azeotropes formed from 1,3-dioxolane and a hydrocarbon having 5 or 6 carbon atoms as a blowing agent or a cleaning solvent has not, however, been described in the prior art.

SUMMARY OF THE INVENTION

It is an object of the present invention to provide novel azeotropic compositions.

It is a further object of the present invention to provide an azeotropic composition which contains no chlorine and therefore has an ozone depletion potential of zero.

It is also an object of the present invention to provide a process for the production of urethane foams in which no halogen-containing blowing agent is employed.

It is another object of the present invention to provide polyurethane foams having good physical properties, which foams are produced without the use of a halogen-containing blowing agent.

These and other objects which will be apparent to those skilled in the art are accomplished with the azeotropic compositions of the present invention. These azeotropic compositions are made up of from (a) about 4 to about 50% by weight 1,3-dioxolane and (b) from one compound selected from (1) from about 75 to about 96% by weight cyclopentane or (2) from about 60 to about 79% by weight 2-methyl pentane or (3) from about 59 to about 77% by weight 3-methyl pentane or (4) from about 50 to about 69% by weight n-hexane, in which the sum of the weight percent of (a) and weight percent of (b) is approximately 100 percent. These azeotropic compositions are included in a foam-forming mixture which includes an isocyanate and isocyanate-reactive material. The foams made with these azeotropic compositions are characterized by good physical properties.

DETAILED DESCRIPTION OF THE INVENTION

Figure 1:
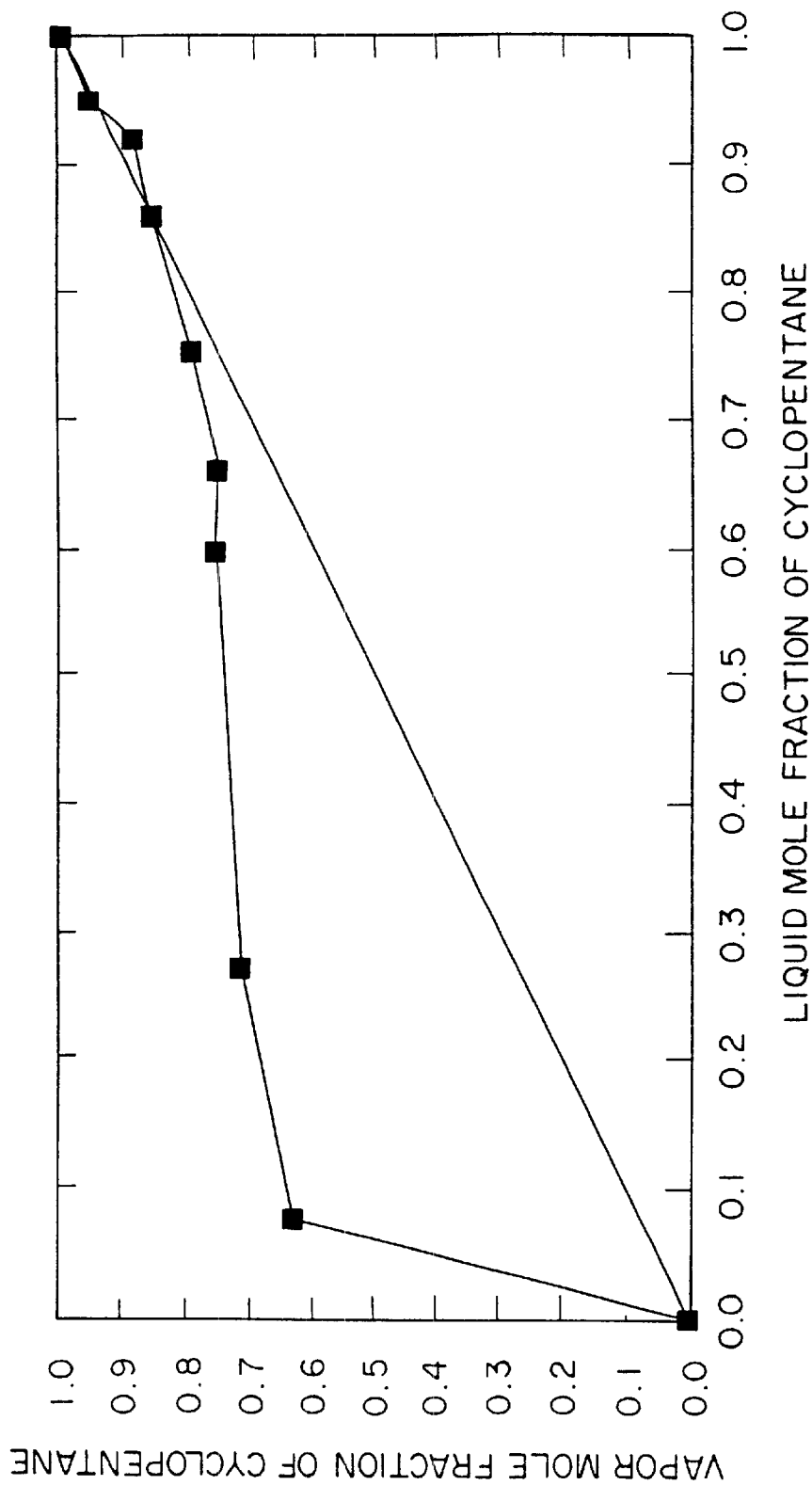
FIG. 1 is a graph showing a plot of the mole fraction of cyclopentane in the vapor phase versus the mole fraction of cyclopentane in the liquid phase of a mixture of cyclopentane and 1,3-dioxolane refluxing at steady state at one atmosphere.

The present invention relates to an azeotropic composition containing no halogen which is particularly useful for the production of rigid foams. This azeotropic composition may also be used for solvent cleaning applications. More particularly, the present invention relates to azeotrope-like compositions consisting essentially of (a) from about 4 to about 50% by weight of 1,3-dioxolane (based on the total weight of the azeotropic composition) and (b) one compound selected from (1) from about 75 to about 96% by weight cyclopentane (based on the total weight of the azeotropic composition)(i.e., from about 76 to about 96 mole %) or (2) from about 60 to about 79% by weight 2-methyl pentane (based on the total weight of the azeotropic composition) (i.e., from about 56 to about 76 mole%) or (3) from about 59 to about 77% by weight 3-methyl pentane (based on the total weight of the azeotropic composition) (i.e., from about 55 to about 74 mole %) or (4) from about 50 to about 69% by weight n-hexane (based on the total weight of the azeotropic composition) (i.e., from about 46 to about 66 mole %). The sum of the weight percent of (a) plus the weight percent of (b) is approximately 100 weight percent.

The compounds which are essential to the compositions of the present invention are 1,3-dioxolane (boiling point= 75° C.), cyclopentane (boiling point=49° C.), 2-methylpentane (boiling point=62° C.), 3-methyl pentane (boiling point=64° C.) and n-hexane (boiling point=69° C.). All of these compounds are known to those in the art and are commercially available. These compounds may be used in the compositions of the present invention at their normal commercial purity (i.e., at least 95%).

Any of the compositions made up of (a) from about 4 to about 50% by weight 1,3-dioxolane and (b) only one compound selected from (1) from about 75 to about 96% by weight cyclopentane or (2) from about 60 to about 79% by weight 2-methyl pentane or (3) from about 59 to about 77% by weight 3-methyl pentane or (4) from about 50 to about 69% by weight n-hexane in which the sum of the weight percent of (a) plus the weight percent of (b) is approximately 100 weight percent is azeotropic in nature in that compositions within these ranges exhibit a substantially constant boiling point. Because they have such a substantially constant boiling point, the mixture does not tend to fractionate to any great extent upon evaporation. After evaporation, only a small difference exists between the composition of the vapor phase and the initial liquid phase. This difference is so small that the compositions of the vapor and liquid phases are considered to be substantially identical. Therefore, any mixture within the above-noted ranges exhibits properties which are characteristic of a true binary azeotrope.

Azeotropic compositions consisting essentially of (a) from about 10 to about 45% by weight 1,3-dioxolane and only one compound selected from (1) from about 80 to about 90% by weight cyclopentane or (2) from about 65 to about 75% by weight 2-methyl pentane or (3) from about 63 to about 73% 3-methyl pentane or (4) from about 55 to about 64% by weight n-hexane in which the sum of weight percent of (a) plus weight percent of (b) is approximately 100 are preferred azeotropic compositions.

More specifically, the azeotropic compositions made up of 1,3-dioxolane and cyclopentane consist essentially of from about 4 to about 25% (preferably from about 10 to about 20%) by weight 1,3-dioxolane and from about 75 to about 96% (preferably from about 80 to about 90%) by weight cyclopentane. The composition consisting essentially of about 14% by weight 1,3-dioxolane and about 86% by weight cyclopentane has been established, within the accuracy of the calibration procedure described below, as the true binary azeotrope with a boiling point of about 48.5° C.

The azeotropic compositions made up of 1,3-dioxolane and 2-methyl pentane consist essentially of from about 21 to about 40% (preferably from about 25 to about 35%) by weight 1,3-dioxolane and from about 60 to about 79% (preferably from about 65 to about 75%) by weight 2-methyl pentane. The composition consisting essentially of about 30% by weight 1,3-dioxolane and about 70% by weight 2-methyl pentane has been established, within the accuracy of the calibration procedure described below, as the true binary azeotrope with a boiling point of 57° C.

The azeotropic compositions made up of 1,3-dioxolane and 3-methyl pentane consist essentially of from about 33 to about 41% (preferably from about 27 to about 37%) by weight 1,3-dioxolane and from about 59 to about 77% (preferably from about 63 to about 73%) by weight 3-methyl pentane. The composition consisting essentially of about 32% by weight 1,3-dioxolane and about 68% by weight 3-methyl pentane has been established, within the accuracy of the calibration procedure described below, as the true binary azeotrope with a boiling point of 58.6° C.

The azeotropic compositions made up of 1,3-dioxolane and n-hexane consist essentially of from about 31 to about 50% (preferably from about 36 to about 45%) by weight 1,3-dioxolane and from about 50 to about 69% (preferably from about 55 to about 64%) by weight n-hexane. The composition consisting essentially of about 40% by weight 1,3-dioxolane and about 60% by weight n-hexane has been established, within the accuracy of the calibration procedure described below, as the true binary azeotrope with a boiling point of 62.8° C.

FIG. 1 shows a graph on which the mole fraction of cyclopentane in the vapor phase is plotted against the mole fraction of cyclopentane in the liquid phase of a mixture of cyclopentane and 1,3-dioxolane refluxing at steady state and at 1 atmosphere. These mole fractions were obtained by gas chromatography and were adjusted to be quantitative by using a calibration curve as is described more fully below. The point at which the mole fraction curve crosses the line with a slope of 1 and intercept 0 is, by definition, the true binary azeotropic composition.

The calibration curve used to calibrate the gas chromatographic results was generated as follows. A series of blends of cyclopentane and 1,3-dioxolane were prepared with from 0 to 100 mole percent cyclopentane in 10% increments. The mole percent of 1,3-dioxolane in each blend was the difference between 100 mole percent and the mole percent of cyclopentane. First, each blend was injected into a Gas Chromatograph ("GC") to establish a correlation between relative peak areas versus actual molar concentrations. This was done by making duplicate samples of each blend and measuring each sample twice. This data was used to establish the calibration curve and a 95% confidence interval which was used to establish the range of error for the azeotropic compositions.

The relative molar amounts of 1,3-dioxolane and cyclopentane necessary to form an azeotropic composition were then determined by a two-step process. In the first step, cyclopentane was charged to a reactor. Subsequently, 1,3-dioxolane was added to the reactor in increments indicated by the datapoints in the graph. After each addition of 1,3-dioxolane, the contents of the reactor were allowed to reflux for 10–15 minutes with the reflux condenser at 0° C. and open to the atmosphere through a drying tube. After steady state was achieved, samples of the liquid and vapor were taken through sample ports. The temperature of the liquid was measured and the temperature of the vapor was measured at a point between the reactor and the condenser. Duplicate samples were injected into the GC and the relative peak areas were recorded. These relative peak areas converted to mole fractions using the calibration curve.

In the second step, 1,3-dioxolane was charged to the reactor. Subsequently, cyclopentane was added to the reactor in increments indicated by the datapoints in the graph. The contents of the reactor were then heated and samples were taken and analyzed in the same manner as was described above with respect to the first step. The data was plotted with the resultant graph being shown in FIG. 1.

Figure 2:
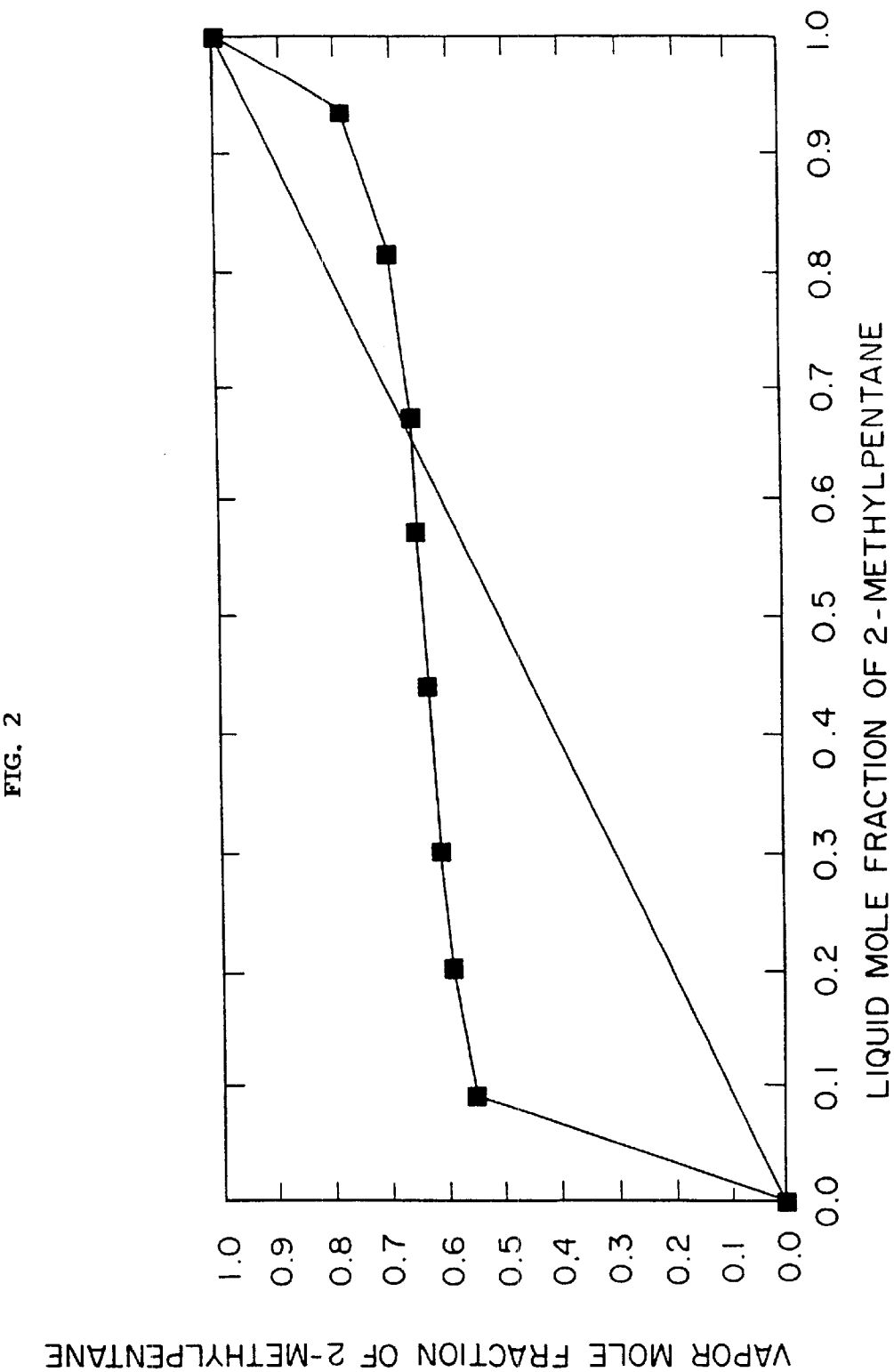
FIG. 2 is a graph showing a plot of the mole fraction of 2-methyl pentane in the vapor phase versus the mole fraction of 2-methyl pentane in the liquid phase of a mixture of 2-methyl pentane and 1,3-dioxolane refluxing at steady state at one atmosphere.
Figure 3:
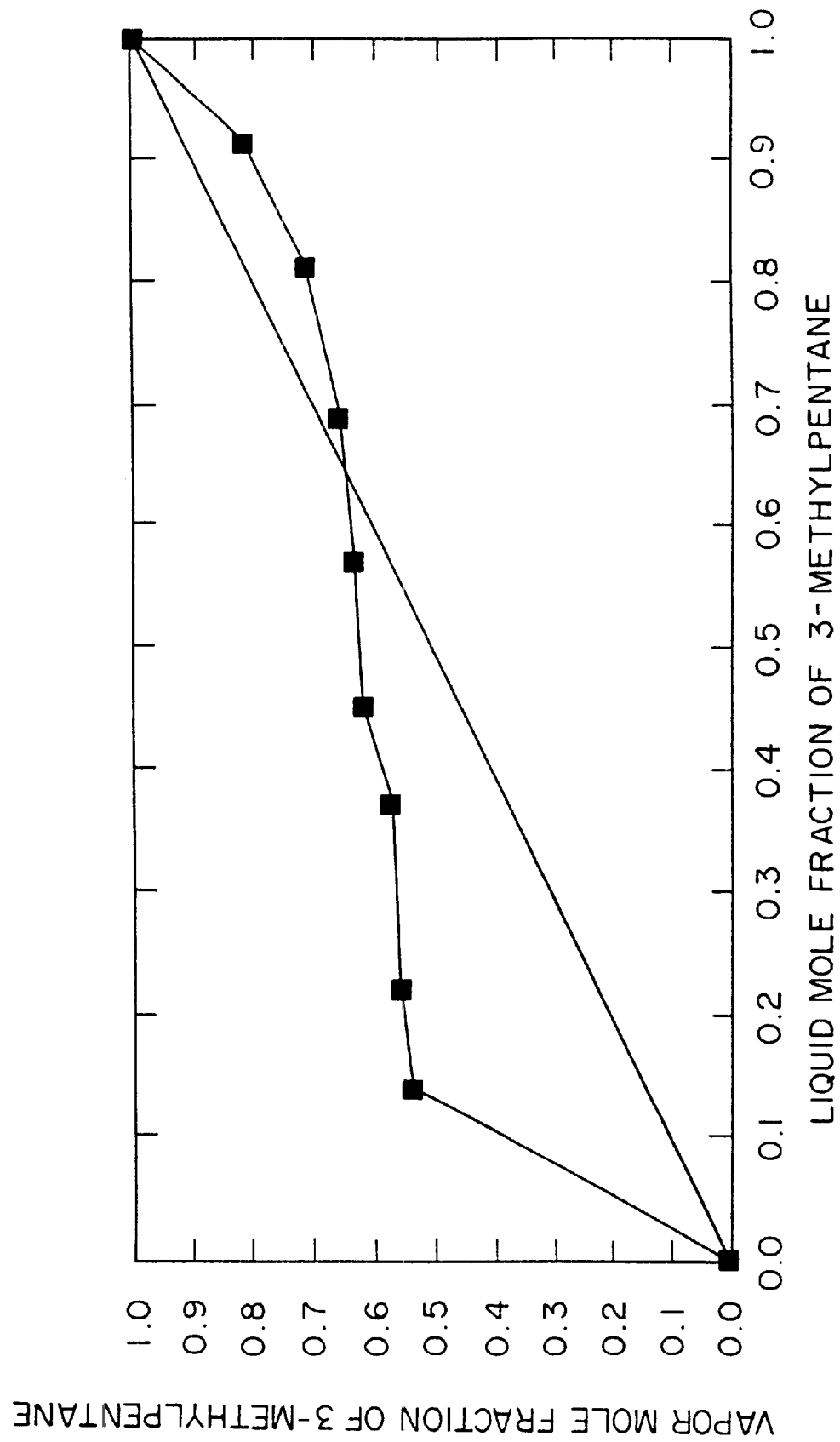
FIG. 3 is a graph showing a plot of the mole fraction of 3-methyl pentane in the vapor phase versus the mole fraction of 3-methyl pentane in the liquid phase of a mixture of 3-methyl pentane and 1,3-dioxolane refluxing at steady state at one atmosphere.
Figure 4:
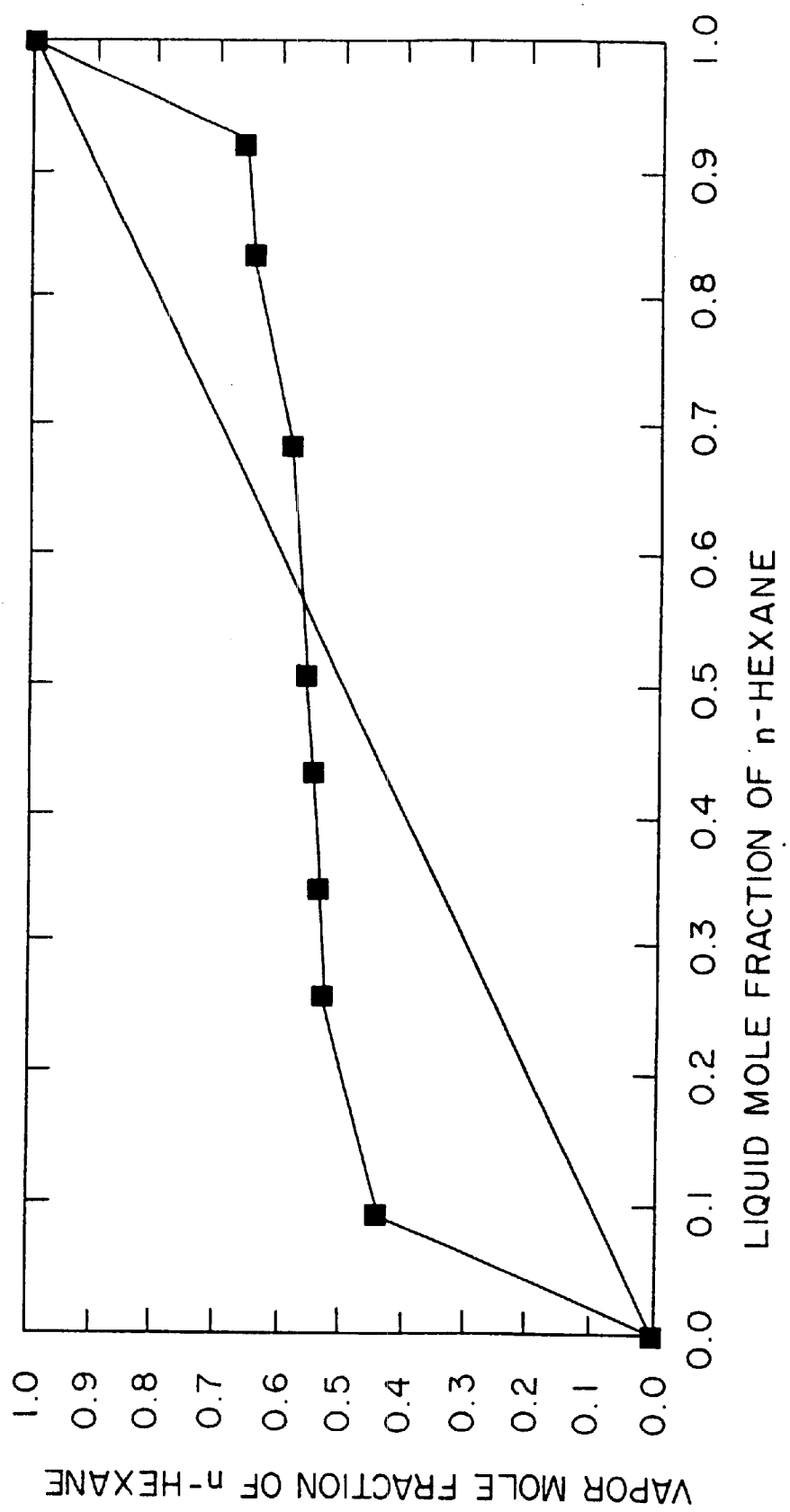
FIG. 4 is a graph showing a plot of the mole fraction of n-hexane in the vapor phase versus the mole fraction of n-hexane in the liquid phase of a mixture of n-hexane and 1,3-dioxolane refluxing at a steady state at one atmosphere.

The graphs shown in FIGS. 2, 3 and 4 were generated in the same manner as FIG. 1 using blends of 1,3-dioxolane and 2-methyl pentane (FIG. 2), 1,3-dioxolane and 3-methyl pentane (FIG. 3) and 1,3-dioxolane and n-hexane (FIG. 4).

An azeotrope is defined as a mixture of liquids where, at the boiling point, the concentration of the components is the same in the liquid and vapor phases. The point at which the mole fraction plot crosses the line having a slope of 1 and an intercept of 0 is the expected azeotropic composition.

The azeotropic compositions of the present invention are particularly useful as halogen-free blowing agents for the production of closed cell, rigid foams. Foams made with the azeotropic compositions of the present invention contain no CFCs, HCFCs, FCs or HFCs but still have relatively low K-factors.

Foams may be produced with the azeotropic compositions of the present invention by reacting a) an isocyanate-reactive material with b) an organic polyisocyanate in the presence of one of the azeotropic compositions of the present invention, optionally in the presence of a catalyst or foam stabilizer. The amount of azeotropic composition used depends on the desired foam density and the presence of additional blowing agents (the water) and has to be adjusted according to methods known to those skilled in the art. Typically, the azeotropic composition is used in an amount of from about 1% to about 20%, preferably from about 2% to about 10%, in a foam forming mixture.

Any of the known isocyanate-reactive materials, organic polyisocyanates (as used herein, "polyisocyanates" includes diisocyanates), catalysts and foam stabilizers may be used to produce foams with the azeotropic compositions of the present invention.

Suitable polyisocyanates which may be used to produce foams from the azeotropic blowing agents of the present invention include aromatic, aliphatic, cycloaliphatic polyisocyanates, modified polyisocyanates and isocyanate-terminated prepolymers of such polyisocyanates. Specific examples of suitable polyisocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,4-cyclohexane diisocyanate, hexahydrotoluene diisocyanate and its isomers, 1,5-naphthylene diisocyanate, 1-methylphenyl-2,4-phenyl diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate, and 3,3'-dimethyl-diphenylpropane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenylisocyanates.

Crude polyisocyanates may also be used in the practice of the present invention. The crude toluene diisocyanate obtained by phosgenating a mixture of toluene diamines and the crude diphenylmethane diisocyanate obtained by phosgenating crude diphenylmethanediamine are examples of suitable crude polyisocyanates. Suitable undistilled or crude polyisocyanates are disclosed in U.S. Pat. No. 3,215,652.

Modified polyisocyanates may be obtained by chemical reaction of diisocyanates and/or polyisocyanates. Modified isocyanates useful in the practice of the present invention include isocyanates containing ester groups, urea groups, biuret groups, allophanate groups, carbodiimide groups, isocyanurate groups, uretdione groups and/or urethane groups. Preferred examples of modified isocyanates include prepolymers containing isocyanate groups and having an isocyanate group content of from about 25 to about 35% by weight, preferably from about 28 to about 32% by weight, particularly those based on polyether polyols or polyester polyols and diphenylmethane diisocyanate. Processes for producing these modified polyisocyanates are known in the art.

Isocyanate-terminated prepolymers having an NCO content of at least about 8%, preferably from about 9 to about 30%, are particularly useful for producing polyurethane foams in accordance with the present invention. Prepolymers of diphenylmethane diisocyanate having NCO contents of from about 8 to about 17%, preferably about 10%, by weight, are particularly preferred. These preferred prepolymers may be made, for example, by pre-reacting diphenylmethane diisocyanate (MDI) or an isomer mixture of MDI with an isocyanate-reactive compound such as a polyol or polyamine having a functionality of from about 1.9 to about 3.1, preferably about 2 in an amount such that the unreacted isocyanate group content is within the above-specified range.

The isocyanate or isocyanate-terminated prepolymer may be reacted with any of the polyols or polyamines which are known to be useful in the production of polyurethane/polyurea foams. Suitable polyols include polyether polyols, polyester polyols, polyacetals, polycarbonates, polyester ethers, polythioethers, polyamides, polybutadienes and polylactones having a molecular weight of from about 400 to about 10,000 and a functionality of at least about two, preferably from about 2 to about 4. Polyether polyols are preferred. Mixtures of polyether polyols are particularly preferred.

Any of the known catalysts, chain extenders, crosslinking agents, auxiliaries and additives may also be included in the foam-forming mixture. An amine catalyst is preferably included in the foam-forming mixtures in an amount such that the foam formation takes place within a reasonable amount of time.

Optional additives and auxiliaries which may be useful in the foam-forming compositions of the present invention include: cell openers such as polyether polyols based on sorbitol, surfactants, particularly silicone surfactants, and crosslinking agents such as aliphatic amines and aromatic amines.

Any of the known methods for producing polyurethane foams may be used in the practice of the present invention. Suitable methods include reaction of the various reactants using the known one-shot process, prepolymer process or semi-prepolymer process.

Having thus described our invention, the following Examples are given as being illustrative thereof. All parts and percentages given in these Examples are parts by weight or percentages by weight, unless otherwise indicated.

EXAMPLES

The following materials were used in the Examples:

| | |
|---|---|
| POLYOL A | A 630 OH number polyol prepared by reacting 1 mole of ethylene diamine with 5 moles of propylene oxide. |
| POLYOL B | A 250 OH number polyol prepared by reacting 1 mole of glycerin with approximately 3.3 moles of propylene oxide. |
| 1,3-Diox | 1,3-dioxolane. |
| CP | cyclopentane. |
| 2-MeP | 2-methyl pentane. |
| 3-MeP | 3-methyl pentane. |
| n-Hex | n-hexane. |
| Tegostab B-8426 | A polysiloxane polyether copolymer which is commercially available from Goldschmidt Chemical Corporation. |
| DMCHA | dimethylcyclohexylamine. |
| ISO | The polymethylene polyphenyl polyisocyanate prepolymer having an NCO content of approximately 27% which is commercially available from Miles Inc. under the name Mondur E-577. |

EXAMPLE 1

12.93 parts of CP and 2.10 parts of 1,3-Diox were first mixed. This mixture was then blended with the other components listed in TABLE 1 under B-SIDE. (The materials and the amount of each of those materials included in the B-SIDE are given in TABLE 1.) The amount of ISO indicated in TABLE 1 was then mixed with the B-SIDE in a mixing vessel using an air driven stirrer. After 5 seconds of mixing, the reaction mixture was poured into a polyethylene-lined cardboard box which measured 14"×14"×3". The reactivity time, density and K-factor of the foam produced were determined. The results of these determinations are reported in TABLE 1.

EXAMPLE 2

The procedure of Example 1 was repeated using the same materials with the exception that a different azeotrope was used. The azeotrope used in this Example was made with 11.88 parts by weight 2-MeP and 5.09 parts by weight of 1,3-Diox. The amounts of the specific materials used and the characteristics of the product foam are reported in TABLE 1.

EXAMPLE 3

The procedure of Example 1 was repeated using the same materials with the exception that a different azeotrope was used. The azeotrope used in this Example was made with 11.51 parts by weight 3-MeP and 5.41 parts by weight 1,3-Diox. The amounts of the specific materials used and the characteristics of the product foam are reported in TABLE1.

EXAMPLE 4

The procedure of Example 1 was repeated using the same materials with the exception that a different azeotrope was used. The azeotrope used in this Example was made with 10.37 parts by weight n-Hex and 6.92 parts by weight 1,3-Diox. The amounts of the specific materials used and the characteristics of the product foam are reported in TABLE 1.

EXAMPLE 5 (COMPARATIVE)

The procedure of Example 1 was repeated using the same materials with the exception that 14.40 parts by weight of cyclopentane alone (rather than an azeotrope) was used as the blowing agent. The specific materials, the amount of each material and the characteristics of the product foam are all reported in TABLE 1.

TABLE 1

| Example | 1 | 2 | 3 | 4 | 5 |
|---|---|---|---|---|---|
| B-SIDE | | | | | |
| POLYOL A, pbw | 61.69 | 61.34 | 61.35 | 61.28 | 61.81 |
| POLYOL B, pbw | 61.69 | 61.34 | 61.35 | 61.28 | 61.81 |
| Tegostab B-8426, pbw | 2.73 | 2.72 | 2.72 | 2.71 | 2.74 |
| Water, pbw | 2.73 | 2.72 | 2.72 | 2.71 | 2.74 |
| DMCHA, pbw | 4.50 | 4.48 | 4.48 | 4.47 | 4.51 |
| CP, pbw | 12.93 | — | — | — | 14.40 |
| 1,3-Diox, pbw | 2.10 | 5.09 | 5.41 | 6.92 | — |
| 2-MeP, pbw | — | 11.88 | — | — | — |
| 3-MeP, pbw | — | — | 11.51 | — | — |
| n-Hex, pbw | — | — | — | 10.37 | — |
| A-SIDE | | | | | |
| ISO, pbw | 201.61 | 200.44 | 200.47 | 200.25 | 202 |
| PROPS. | | | | | |
| Mix Time (sec) | 5 | 5 | 5 | 5 | 5 |
| Cream Time (sec) | <10 | <10 | <10 | <10 | <10 |
| Gel Time (sec) | 34 | 35 | 35 | 32 | 36 |
| Density (lb/ft$^3$) | 1.94 | 2.03 | 2.03 | 2.09 | 1.92 |
| K-Factor (BTU-in./° F. ft$^2$) | 0.131 | 0.144 | 0.142 | 0.144 | 0.132 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An azeotropic composition consisting essentially of from about 25 to about 35% by weight 1,3-dioxolane and from about 65 to about 75% by weight 2-methyl pentane.

2. An azeotropic composition consisting essentially of from about 36 to about 45% by weight 1,3-dioxolane and from about 55 to about 64% by weight n-hexane.

3. An azeotropic composition which is made up of about 30% by weight 1,3-dioxolane and about 70% by weight 2-methyl pentane.

4. An azeotropic composition which is made up of about 40% by weight 1,3-dioxolane and about 60% by weight n-hexane.

* * * * *